US012572424B2

(12) United States Patent
Iwauchi

(10) Patent No.: US 12,572,424 B2
(45) Date of Patent: Mar. 10, 2026

(54) INCORPORATED DEVICE, METHOD FOR CONTROLLING STARTUP OF INCORPORATED DEVICE, AND STORAGE MEDIUM

(71) Applicant: CANON KABUSHIKI KAISHA, Tokyo (JP)

(72) Inventor: Nobuyuki Iwauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 18/628,887

(22) Filed: Apr. 8, 2024

(65) Prior Publication Data

US 2024/0345927 A1 Oct. 17, 2024

(30) Foreign Application Priority Data

Apr. 11, 2023 (JP) ................................. 2023-064035

(51) Int. Cl.
*G06F 11/14* (2006.01)

(52) U.S. Cl.
CPC ...... *G06F 11/1433* (2013.01); *G06F 11/1417* (2013.01)

(58) Field of Classification Search
CPC .. G06F 11/14; G06F 11/1417; G06F 11/1433; G06F 9/4401; G06F 9/4416
See application file for complete search history.

(56) References Cited

U.S. PATENT DOCUMENTS

| | | | |
|---|---|---|---|
| 9,563,416 B2 | 2/2017 | Dokai | |
| 11,093,321 B1* | 8/2021 | Zeavelou | ............ G06F 11/0793 |
| 2016/0094597 A1* | 3/2016 | Nishida | ............... H04L 65/4038 |
| | | | 709/204 |
| 2018/0181461 A1* | 6/2018 | Gross | ................... G06F 11/3055 |
| 2020/0327006 A1* | 10/2020 | Khanna | ............... G06F 11/1438 |
| 2021/0377289 A1* | 12/2021 | Okano | ................ H04L 63/1425 |

FOREIGN PATENT DOCUMENTS

JP 2016110461 A 6/2016

* cited by examiner

*Primary Examiner* — Philip Guyton
*Assistant Examiner* — Sean Kevin Mcnamara
(74) *Attorney, Agent, or Firm* — Venable LLP

(57) ABSTRACT

An incorporated device has a first startup control unit that, in a case where a firmware fault occurs in a first mode in which normal operation is performed, restarts the incorporated device with some of functions that are operated in the first mode being disabled; and a second startup control unit that, in a case where the fault does not occur after the incorporated device is restarted with the some functions being disabled, continues the startup in a second mode in which the some functions are disabled.

11 Claims, 8 Drawing Sheets

| FIG.4A |
|--------|
| FIG.4B |

510

FIRMWARE BEING UPDATED

520

FIRMWARE UPDATE COMPLETED

530

PRINTER IS GOING TO RESTART WITH THE FOLLOWING FUNCTIONS ENABLED.

· OS STANDARD PRINT/ SCAN FUNCTION
· SNMP
· WEB SERVICE

OK

531

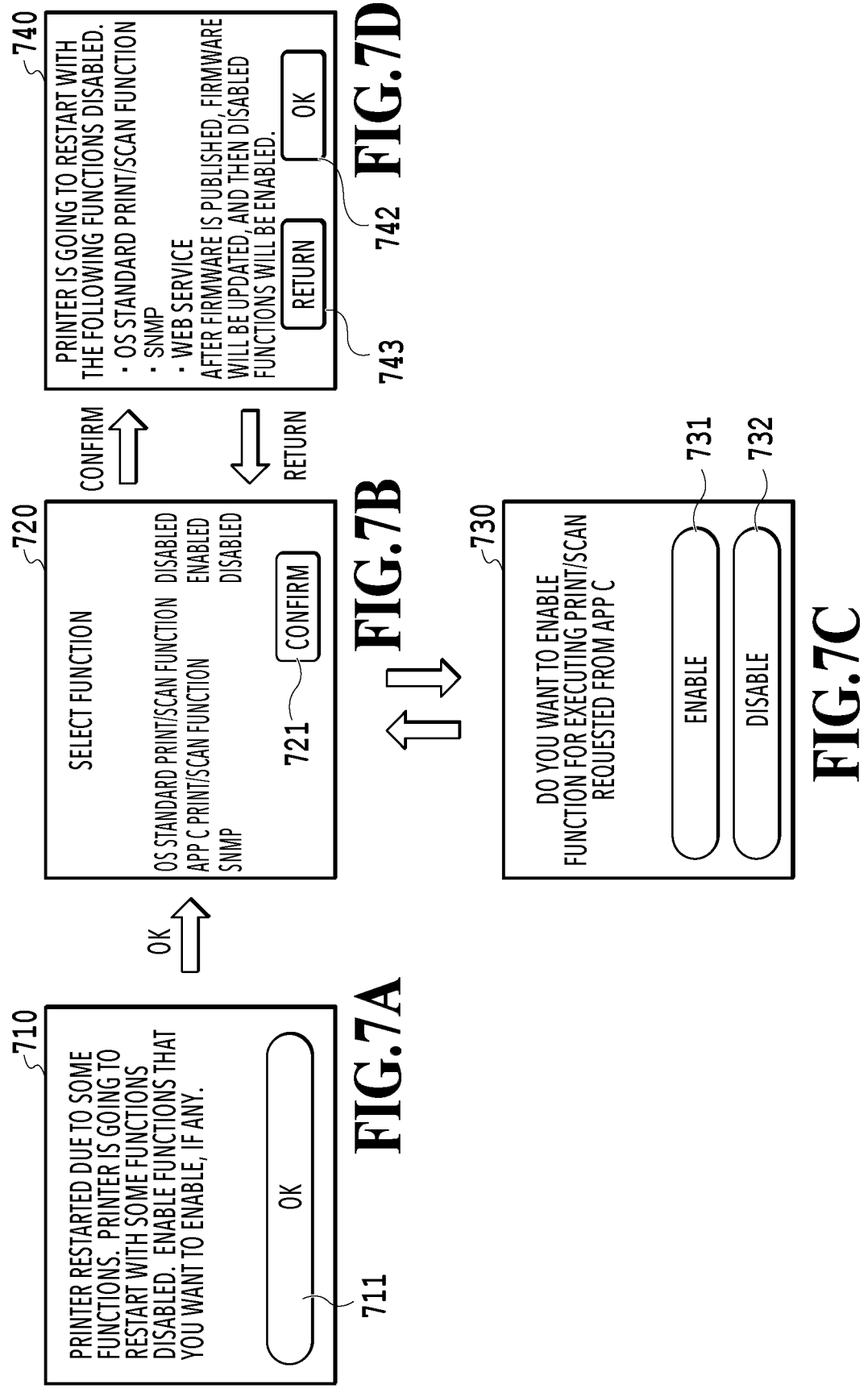

PRINTER RESTARTED DUE TO SOME
FUNCTIONS. PRINTER IS GOING TO
RESTART WITH SOME FUNCTIONS
DISABLED. ENABLE FUNCTIONS THAT
YOU WANT TO ENABLE, IF ANY.

SELECT FUNCTION

OS STANDARD PRINT/SCAN FUNCTION    DISABLED
APP C PRINT/SCAN FUNCTION    ENABLED
SNMP    DISABLED

721    CONFIRM

CONFIRM ⟱    RETURN ⟱

DO YOU WANT TO ENABLE
FUNCTION FOR EXECUTING PRINT/SCAN
REQUESTED FROM APP C

731    ENABLE

732    DISABLE

PRINTER IS GOING TO RESTART WITH
THE FOLLOWING FUNCTIONS DISABLED.
· OS STANDARD PRINT/SCAN FUNCTION
· SNMP
· WEB SERVICE
AFTER FIRMWARE IS PUBLISHED, FIRMWARE
WILL BE UPDATED, AND THEN DISABLED
FUNCTIONS WILL BE ENABLED.

743    RETURN    OK    742

1

INCORPORATED DEVICE, METHOD FOR CONTROLLING STARTUP OF INCORPORATED DEVICE, AND STORAGE MEDIUM

BACKGROUND OF THE INVENTION

Field of the Invention

The present disclosure relates to control of startup of an incorporated device such as a printer.

Description of the Related Art

A typical printer has a print function, a scan function, and the like as its basic functions. In recent years, in addition to the basic functions, a function for cooperating with various information terminals and web services is incorporated in the printer, and a user can add a desired function. For example, there are printers with a function incorporated therein to support a print/scan function provided on the operating system (OS) of a smartphone, a personal computer (PC), or the like.

Also, using a network communication function therein, a printer can access the Internet to download functions provided by various vendors or to use a web service directly from the printer.

Because various functions (applications) are thus installed in an incorporated device such as a printer, competition for resources, the order of registration or usage of services, and the like between the applications may lead to unstable operation. Starting the incorporated device in safe mode as a means to recover from such a situation has been proposed. Japanese Patent Laid-Open No. 2016-110461 (Literature 1) discloses a technique where in a case where a user has installed a problematic fragment bundle into an information processing apparatus, the system is started in safe mode so as to be started safely with the applications installed by the user being disabled.

Incidentally, an incorporated device such as a printer has firmware implemented therein in advance to perform basic control of circuits, devices, and the like in the main body. Should this firmware have a fault, the incorporated device cannot be started normally and cannot be used. For example, in a case where a certain application is updated and is no longer supported by the current firmware, the printer cannot be started even though there is no problem in the printer itself. However, because updating the firmware requires starting the printer, a fault in the printer cannot be solved unless the printer can be started.

Also, from the perspective of convenience, there have been demands that a user can continue using the printer as normally as possible even in a case where the printer is started in safe mode as in Literature 1.

SUMMARY OF THE INVENTION

An incorporated device according to the present disclosure includes: a first startup control unit that, in a case where a firmware fault occurs in a first mode in which normal operation is performed, restarts the incorporated device with some of functions that are operated in the first mode being disabled; and a second startup control unit that, in a case where the fault does not occur after the incorporated device is restarted with the some functions being disabled, continues the startup in a second mode in which the some functions are disabled.

Further features of the present invention will become apparent from the following description of exemplary embodiments with reference to the attached drawings.

BRIEF DESCRIPTION OF THE DRAWINGS

FIGS. 7A to 7D are diagrams showing how the screen changes in transition to safe mode.

DESCRIPTION OF THE EMBODIMENTS

Embodiments of the present disclosure are described in detail below with reference to the drawings. Note that the configurations and operations described in the embodiments are provided to show example modes of the present disclosure and are not intended to limit the scope of the disclosure.

First Embodiment

Figure 1:
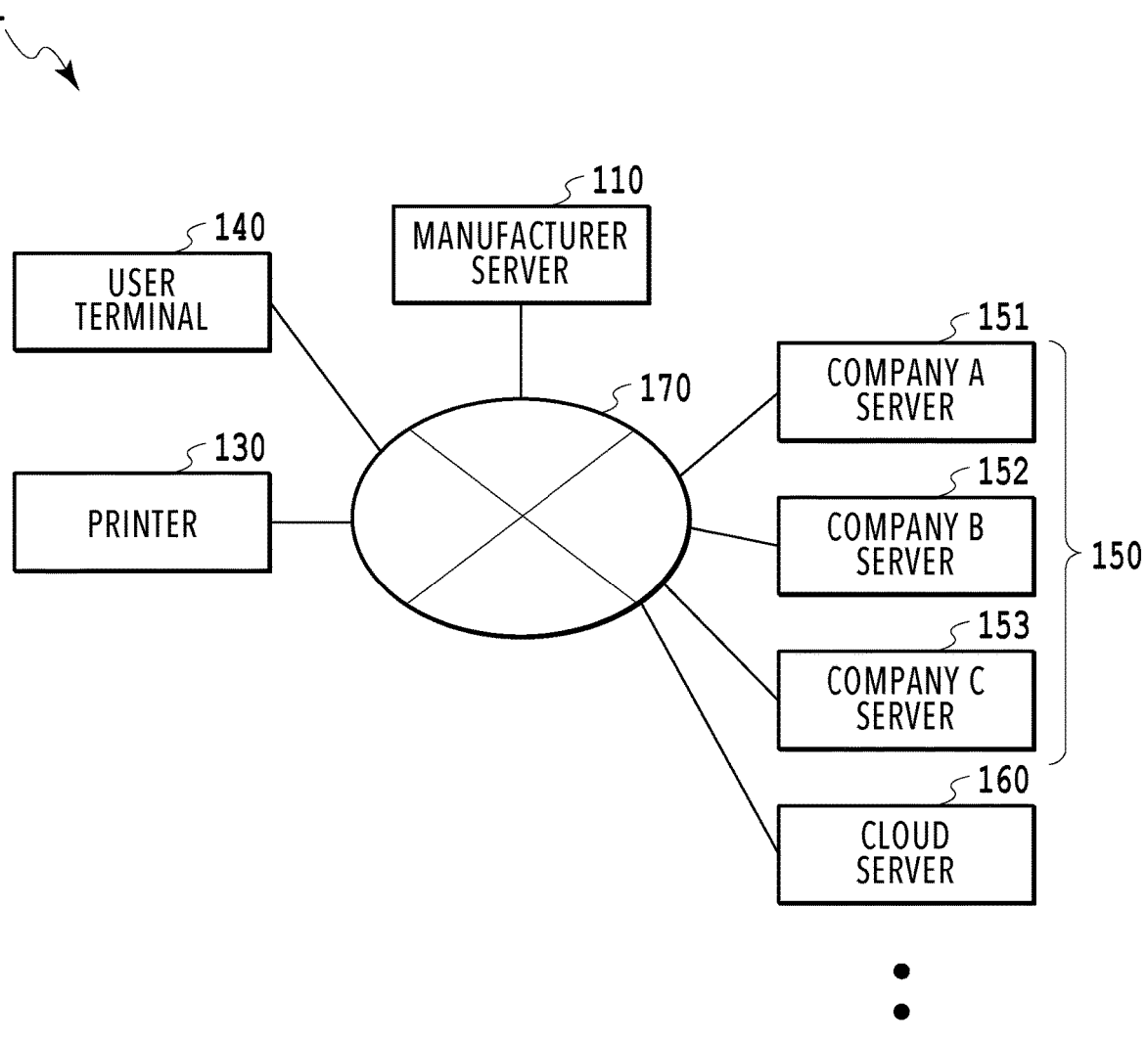
FIG. 1 is a diagram showing the overall configuration of a printing system.

FIG. 1 is a diagram showing the overall configuration of a printing system 1 including a printer 130 which is one embodiment of an incorporated device according to the present disclosure. As shown in FIG. 1, in the printing system 1, the printer 130, a user terminal 140, and a manufacturer server 110 are communicatively connected via a network 170. Also, in the printing system 1, servers of vendors providing applications and web services, such as a company A server 151, a company B server 152, and a company C server 153 (hereinafter referred to as external servers 150), a cloud server 160, and the like are communicatively connected via the network 170.

The manufacturer server 110 is a server of a maker that manufactured the printer 130 and provides various services related to the printer 130. The manufacturer server 110 is a computer that stores and manages firmware, application programs, data, and the like for the printer 130. In response to a request transmitted from the printer 130 or the user terminal 140, the manufacturer server 110 transmits the firmware, application programs, data, and the like described above to the printer 130 or the user terminal 140 making the request.

The user terminal 140 is a terminal used by the user of the printer 130 and is a computer terminal with a communication function, such as a PC, a tablet, or a smartphone. The user terminal 140 has, for example, a control unit (a CPU, a ROM, and a RAM), a storage unit (e.g., an HDD and an SSD), a communication unit, a display unit (e.g., a liquid crystal display), an input unit (e.g., a keyboard and a mouse), a peripheral interface unit, and the like. The connection between the user terminal 140 and the printer 130 may be connection through the peripheral interface unit or may be communication connection through the network 170 such as a LAN or a WAN.

The user terminal 140 has a printer driver installed therein for remote operation and control of the printer 130. A user can input operation information from the operation unit of the user terminal 140 to the printer 130, and the user terminal 140 can receive display data transmitted from the printer 130 and display the display data on the display unit thereof. The user terminal 140 transmits print data including a print instruction to the printer 130 and receives scan data generated by the printer 130. The user terminal 140 also executes processing related to addition of an application program to the printer 130 or an update thereof.

Figure 2:
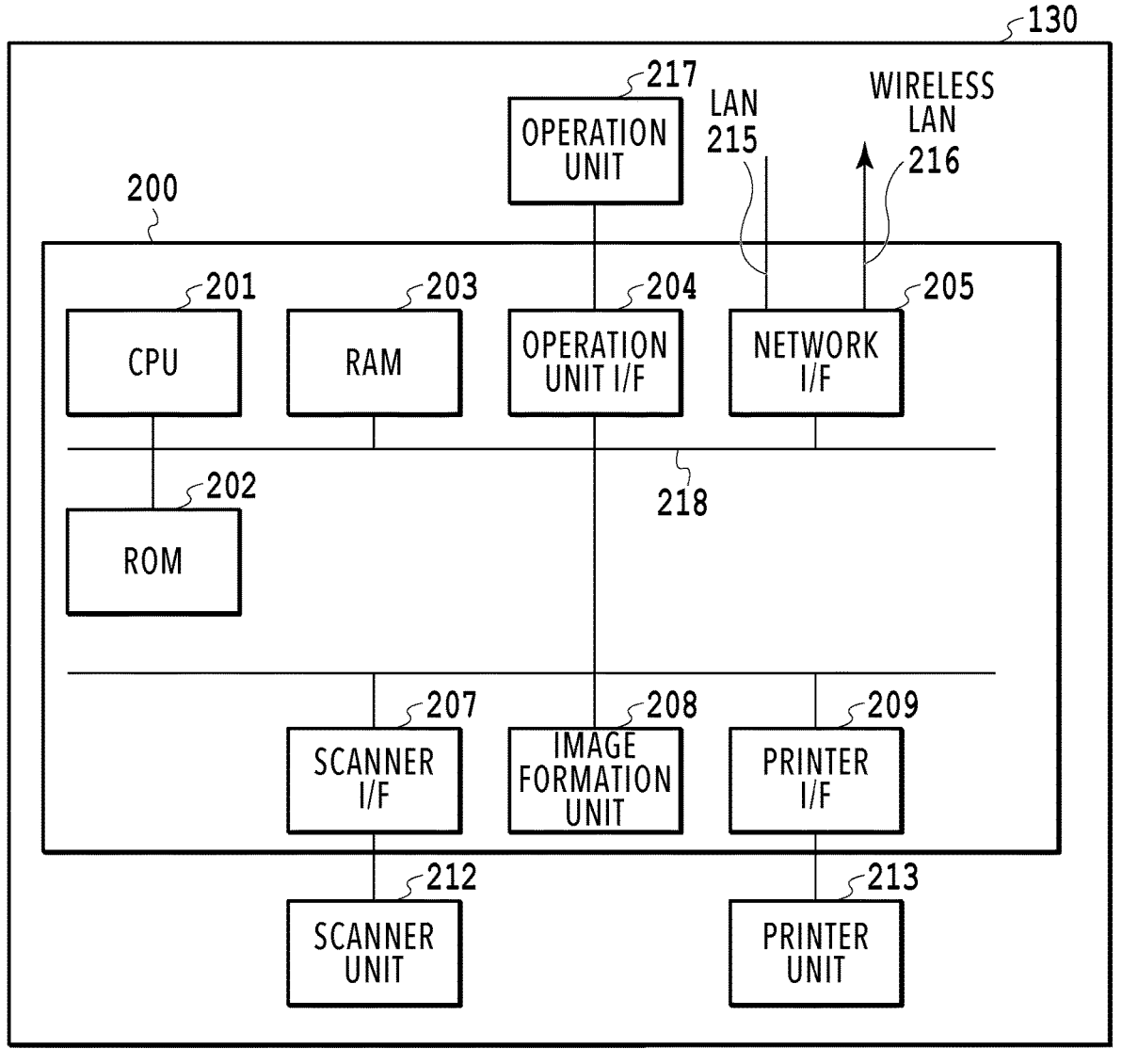
FIG. 2 is a block diagram showing an example hardware configuration of a printer.

The printer 130 is an incorporated device including functions such as a print function, a scan function, and a network communication function. FIG. 2 is a block diagram showing an example hardware configuration of the printer 130. As shown in FIG. 2, the printer 130 includes a control unit 200, a scanner unit 212, a printer unit 213, an operation unit 217, and the like and is connected to external devices via a network I/F 205. The external devices are devices other than the printer 130, such as, for example, the user terminal 140, the manufacturer server 110, the external servers 150, and the cloud server 160 shown in FIG. 1.

The control unit 200 includes a CPU 201, a ROM 202, a RAM 203, an operation unit interface (I/F) 204, the network I/F 205, a scanner I/F 207, an image formation unit 208, a printer I/F 209, and the like. These units are connected by a system bus 218.

The CPU 201 reads and loads programs stored in the ROM 202 into the RAM 203 and executes various kinds of processing performed inside the control unit 200. For example, based on the firmware stored in the ROM 202, the CPU 201 performs overall control of various pieces of hardware currently being connected, such as the image formation unit 208, the operation unit 217, the scanner unit 212, and the printer unit 213.

The ROM 202 is a read-only non-volatile storage region and a rewritable storage region such as a flash ROM and stores therein a boot program and various application programs (hereinafter referred to as applications) of for the printer 130. The applications include, in addition to the firmware for the printer 130, pre-installed applications and applications for executing additional functions.

The additional applications include not only applications provided by the manufacturer of the printer 130, but also applications provided by vendors other than the manufacturer. A firmware update program can be downloaded from the manufacturer server 110 of the printer 130 to the printer 130 via the network 170 and written into the flash ROM. An application provided by a vendor other than the manufacturer can be downloaded from the external server 150, the cloud server 160, or the like to the printer 130 via the network 170 and written into the flash ROM.

The RAM 203 has a system work memory region for the CPU 201 to run and stores various kinds of data temporarily. The RAM 203 is formed by a non-volatile memory, like a FRAM (registered trademark) or the like, that can retain stored information even after power is turned off and a volatile memory (such as a DRAM) that loses stored information after power is turned off. Configuration information on the printer 130 is stored in the non-volatile memory in the RAM 203. Settings on a startup mode and the status (disabled or enabled) of each application (function), data needed in starting applications, and the like are stored as the configuration information.

The operation unit I/F 204 is an interface unit for connecting the control unit 200 and the operation unit 217 to each other. Specifically, the operation unit I/F 204 receives, via the system bus 218, display data outputted from the CPU 201 and displays the display data on the display of the operation unit 217. The operation unit I/F 204 also outputs, to the CPU 201 via the system bus 218, data inputted from an input unit of the operation unit 217, such as an operation button or a touch panel.

The operation unit 217 has a display such as a liquid crystal panel and input devices such as various operation buttons and a touch panel. The operation unit 217 outputs a user instruction inputted thereto via an input device to the control unit 200 and displays display data inputted from the control unit 200 on the display.

The network I/F 205 is an interface unit for connecting the control unit 200 of the printer 130 to a LAN 215 and/or a wireless LAN 216 and has a communication control circuit, a communication port, and the like. The control unit 200 inputs and outputs information to and from a communicatively-connected external device via the network I/F 205.

The scanner I/F 207 is an interface unit for connecting the control unit 200 and the scanner unit 212 to each other. The scanner I/F 207 performs image processing, such as correction, modification, and editing, on image data received from the scanner unit 212. The scanner unit 212 optically scans information on a scan surface of a scan target using a CCD or the like, converts the information into image data which is digital signals, and outputs the image data to the image formation unit 208 or the CPU 201.

The image formation unit 208 is a processor for image processing such as a graphics processing unit (GPU) and performs image processing on image data such as directional conversion, image compression, and expansion.

The printer I/F 209 is an interface unit that connects the printer unit 213 to the CPU 201 and the image formation unit 208. The printer I/F 209 receives image data sent from the CPU 201 or the image formation unit 208 and outputs the image data to the printer unit 213. The printer unit 213 prints image data sent from the CPU 201 or the image formation unit 208 on a print medium according to print instruction data transmitted from the CPU 201.

Figure 3:
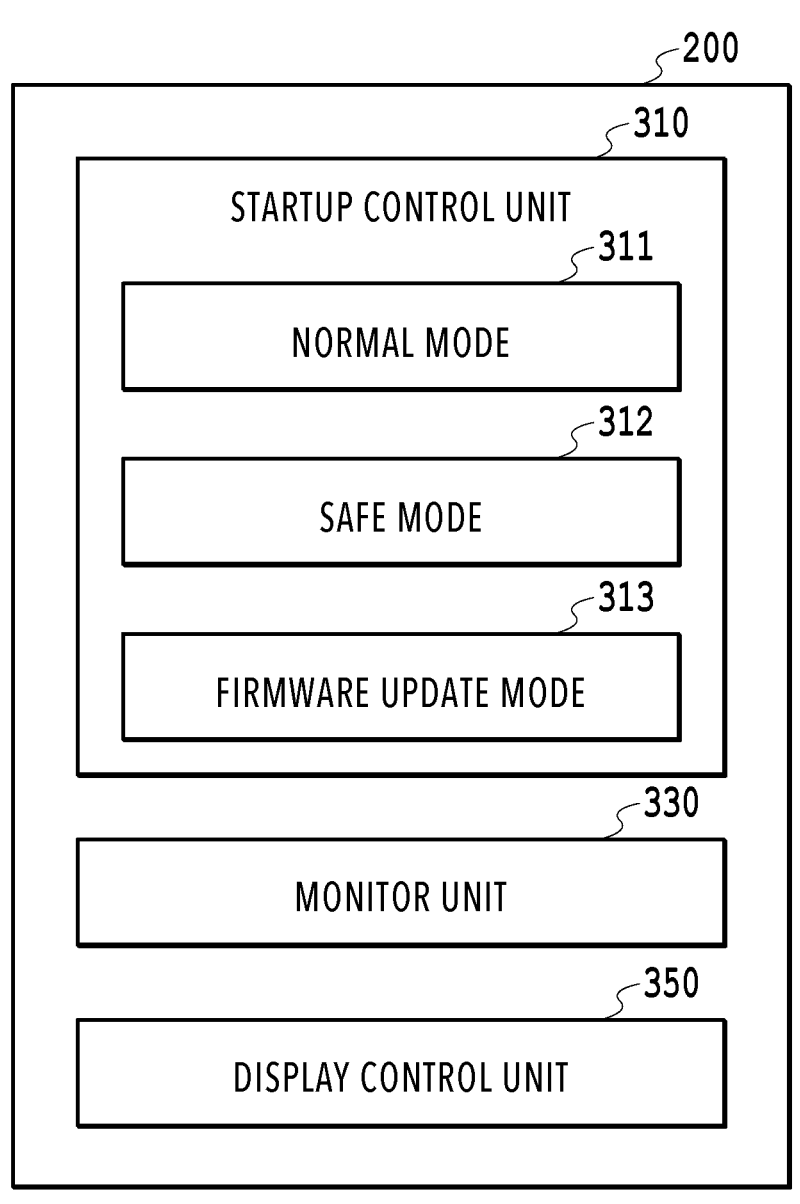
FIG. 3 is a block diagram showing the functional configuration of a control unit of the printer.

Next, the functional configuration of the control unit 200 of the printer 130 is described with reference to FIG. 3. FIG. 3 is a block diagram showing the functional configuration of the control unit 200 of the printer 130. As shown in FIG. 3, the control unit 200 has a startup control unit 310, a monitor unit 330, and a display control unit 350.

The startup control unit 310 controls operation for starting the printer 130. In the present embodiment, the startup control unit 310 executes startup processing as shown in the flowchart in FIG. 4. The startup processing is started once the power of the printer 130 is switched from OFF to ON.

In the startup processing, the startup control unit 310 reads the boot program from the ROM 202 and start the firmware and various applications according to the boot program. The startup control unit 310 refers to the configuration information recorded in the non-volatile memory in the RAM 203 and performs, e.g., determination of a startup mode, determination of whether there is a watchdog timeout history, obtainment of information on functions to disable in transition to safe mode 312.

The printer 130 of the present embodiment has the following startup modes: normal mode 311, safe mode 312, and firmware update mode 313. The startup control unit 310 switches the startup mode according to the operation status. The operation status is determined based on whether a watchdog timeout occurs. Specifically, in a case where a watchdog timeout occurs, the startup control unit 310 determines that there is a firmware fault.

The normal mode 311 is a mode where the printer 130 is started with all its functions (applications of the basic and additional functions) installed therein being enabled.

The safe mode 312 is a mode where the printer 130 is started with some of the functions being disabled, and functionality is limited compared to the normal mode 311. In a case where a watchdog timeout occurs while the printer 130 is being started in the normal mode 311, the startup control unit 310 disables some functions and then restarts the printer 130 in that state. Unless a watchdog timeout occurs after that, the printer 130 is started in the safe mode 312.

Also, while the printer 130 is operated in the safe mode 312, the monitor unit 330 monitors whether there is firmware update information. Until a firmware update program becomes available (while firmware update information is not detected), the startup control unit 310 continues the safe mode 312. Once firmware update information is detected, the startup control unit 310 switches the startup mode from the safe mode 312 to the firmware update mode 313 and restarts the printer 130 in the firmware update mode 313.

The firmware update mode 313 is a mode where the firmware is updated upon startup. In the firmware update mode 313, the startup control unit 310 updates the firmware, enables disabled functions, switches the startup mode back to the normal mode 311, and restarts the printer 130.

The monitor unit 330 monitors whether there is firmware update information. The monitor unit 330 accesses the manufacturer server 110 periodically to check whether there is a firmware update program available. To the startup control unit 310, the monitor unit 330 sends information indicating whether there is firmware update information.

The display control unit 350 controls the screen displayed on the operation unit 217 while the startup control unit 310 executes the startup processing. For example, the display control unit 350 displays, on the operation unit 217, a screen showing functions disabled in the safe mode 312 or displays, on the operation unit 217, a screen showing the progress of a firmware update. Also, until a firmware update is completed, the display control unit 350 may notify a user that update information can be checked on the web by displaying such an indication periodically.

Next, the startup processing executed by the control unit 200 of the printer 130 is described.

Figures 4, 4A:
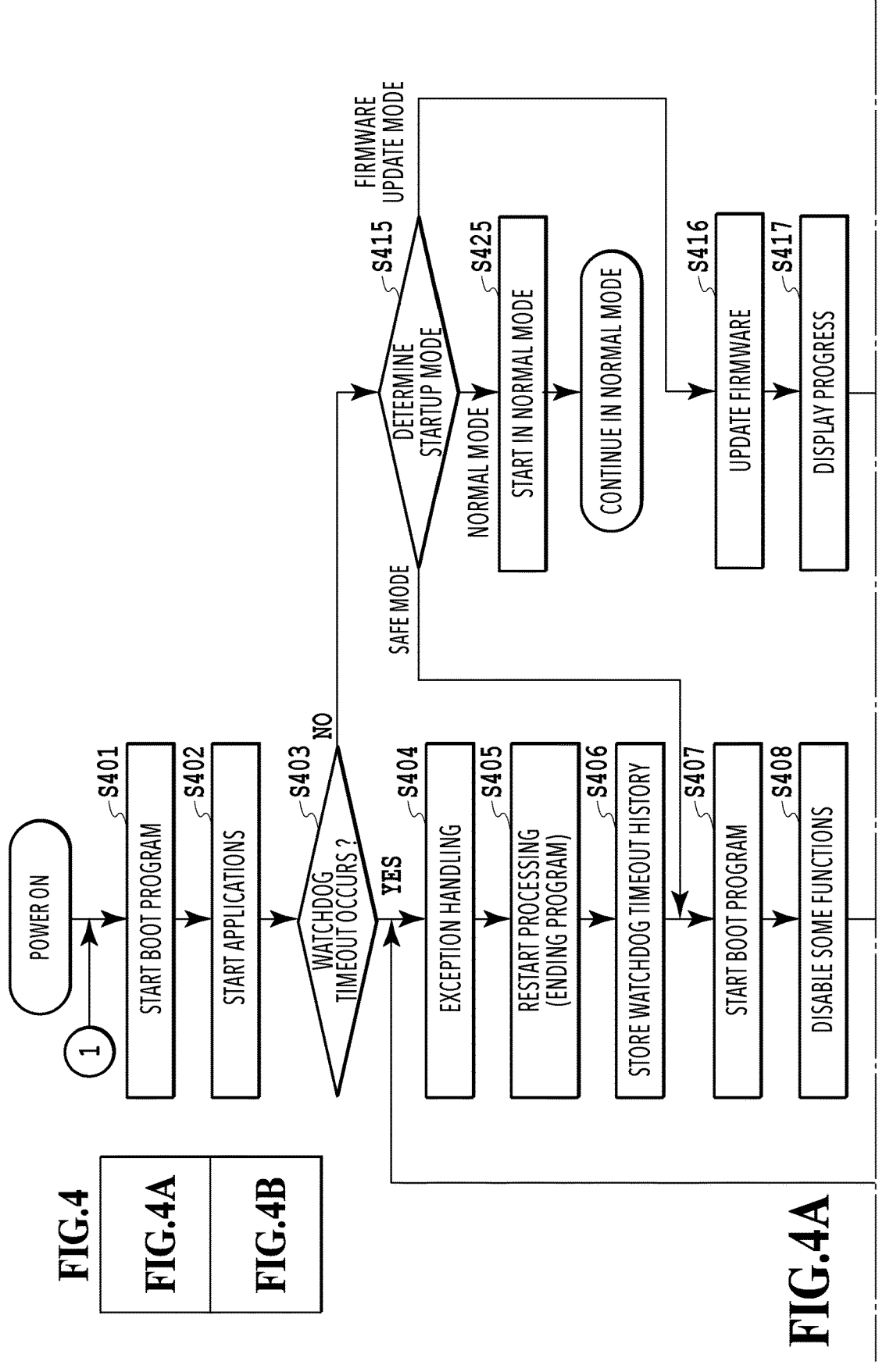
FIG. 4 is a diagram showing the relationship of FIGS. 4A and 4B.
FIGS. 4A and 4B are totally a diagram illustrating an example of a flowchart showing how startup processing is performed.
Figure 4B:
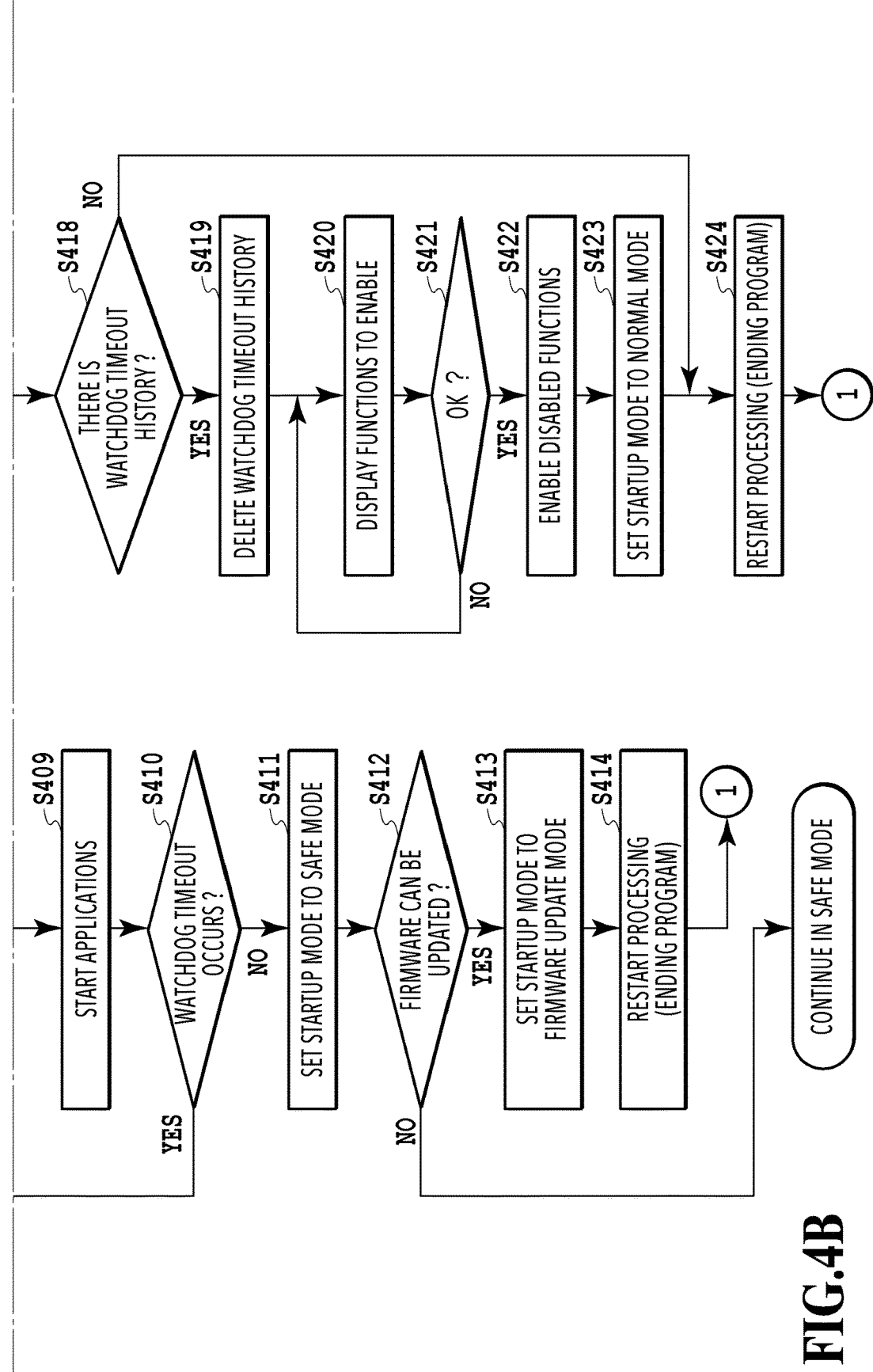

FIGS. 4A and 4B are totally a diagram illustrating an example of a flowchart showing how the startup processing is performed. The processing shown in this flowchart is executed by the CPU 201 after the CPU 201 calls a program stored in the ROM 202 or the RAM 203 and loads the program into the RAM 203. In the following description, the letter "S" denotes a step.

In a case where the power of the printer 130 is switched from OFF to ON, in S401, the CPU 201 (the startup control unit 310) reads the boot program from the ROM 202 and starts the startup processing for the printer 130. The startup control unit 310 refers to the configuration information stored in the non-volatile memory in the RAM 203 and reads startup mode, a setting value on each application (information on the status (enabled or disabled)), and data necessary for startup of the applications.

Next, in S402, the startup control unit 310 starts the applications of the printer 130 (the firmware and additional applications). After the applications start running, a firmware fault may occur and hinders the printer 130 from being started normally. For example, in a case where the communication function of the printer 130 is set to "enabled" in the configuration information, the printer 130 may communicate with an external device such as the external server 150 or the user terminal 140 via the network I/F 205 upon start of the applications.

In the communication with an external device, in a rare case, the printer 130 receives unintended data (such as data unexpected at the time of designing of the firmware), which leads to a firmware fault. In a case where a module of an application of the printer 130 makes an invalid address reference, a watchdog timeout occurs.

In S403, the CPU 201 determines whether a watchdog timeout occurs. In a case where a watchdog timeout occurs (S403; Yes), the processing proceeds to S404, and performs exception handling.

The startup control unit 310 restarts the printer 130 as recovery processing. First, in S405, the startup control unit 310 ends the program. In S406, the startup control unit 310 stores, as history information, an indication that a watchdog timeout has occurred in the non-volatile memory in the RAM 203.

Next, in S407, the startup control unit 310 reads the boot program from the ROM 202 and starts the printer 130, as it does upon power-on.

Further, in S408, the startup control unit 310 disables some functions.

In S409, the startup control unit 310 starts functions (applications) that are not disabled. Here, the functions disabled in S408 are predetermined functions.

Specifically, they are functions that require the printer 130 to access an external device (the external server 150, the cloud server 160, or the user terminal 140) via the network I/F 205. Specifically, the functions disabled are, for example, a function that uses a web service (a web service), the SNMP, an OS standard print/scan function provided by the OS of various kinds of information terminals, and the like.

In these functions, the control unit 200 of the printer 130 transmits and receives signals to and from the external server 150, the cloud server 160, or the user terminal 140 in conformity with a predetermined communication protocol. In that event, there is a possibility that the network protocol has been revised, and information against the intension of the application incorporated in the printer 130 may be returned to the printer 130. This causes a watchdog timeout.

Particularly, the external server 150, the cloud server 160, and an application run and provided by a vendor other than the manufacturer of the printer 130 may have a version upgrade of a function irrespective of the specifications of the printer 130. This is true to the OS and applications in the user terminal 140, and in a case where there has been a version upgrade irrespective of the specifications of the printer 130, the printer 130 cannot support the upgrade, and a firmware fault may occur.

For this reason, functions that require network connection (such as a web service function, an OS standard print/scan function, and the SNMP described above) are disabled in advance to allow other functions in the printer 130 to be operated in a state where no firmware fault occurs. However, the communication function of the network I/F 205 itself needs to remain enabled so that a firmware update to be described later can be performed. Note that the functions disabled in S408 do not go back to being enabled except in the iteration processing (S404 to S410) to be described later or in the processing in S422 to be described later.

In S409, the startup control unit 310 starts the applications that are not disabled.

After that, in S410, the startup control unit 310 checks whether a module makes an invalid address reference. Here, in a case where a watchdog timeout does not occur (S410; No), it means that there is no firmware fault occurring; thus, the processing proceeds to S411.

In S411, the startup control unit 310 sets the startup mode to the safe mode 312 and starts the printer 130.

In a case where the module makes an invalid address reference and a watchdog timeout occurs in S410 (S410; Yes), the processing proceeds back to S404 to repeat the processing from S404 to S410. In the iteration processing in S404 to S410, the startup control unit 310 sequentially increases or changes functions to disable.

For example, the startup control unit 310 first disables a function A that requires network connection to the company A server 151 and then starts the printer 130 in that state. Then, in a case where a watchdog timeout occurs, the startup control unit 310 next disables a function B that requires network connection to the company B server 152. Then, in a case where a watchdog timeout occurs after startup in that state, the startup control unit 310 further disables a function C that requires network connection to the company C server 153. More and more functions are disabled sequentially in this way, and once the watchdog timeout no longer occurs, the startup control unit 310 continues the startup processing in the safe mode 312.

Alternatively, the following processing may be performed. First, the startup control unit 310 disables the function A and enables the functions B and C. In a case where a watchdog timeout occurs after startup in that state, the startup control unit 310 next disables the function B and enables the functions A and C. In a case where a watchdog timeout occurs again after startup in that state, the startup control unit 310 disables the function C and enables the functions A and B. Once the watchdog timeout no longer occurs after sequentially increasing or changing the functions to disable, the startup control unit 310 continues the startup processing in the safe mode 312.

In a case where a watchdog timeout occurs even after the processing from S404 to S410 is repeatedly performed, the startup control unit 310 issues an error notification and forces a shutdown.

After the startup in the safe mode 312, in S412, the CPU 201 determines whether the firmware can be updated. The CPU 201 (the monitor unit 330) periodically monitors update information on the firmware update. Specifically, the monitor unit 330 accesses the manufacturer server 110, the provider of the firmware, via the network I/F 205 and monitors whether there is a firmware update program available. Note that the access to the manufacturer server 110 (an access to obtain the firmware update information) is not one of the functions disabled in S408, and it is enabled.

Until the monitor unit 330 detects that there is a firmware update program available, the startup control unit 310 continues the startup processing in the safe mode 312.

In a case where the monitor unit 330 detects that there is a firmware update program available, in S412, the startup control unit 310 determines that the firmware can be updated (S412; Yes). In a case where the firmware can be updated, the processing proceeds to S413.

In S413, the startup control unit 310 sets the startup mode to the firmware update mode 313 and proceeds to S414 to perform restart processing.

In S413, the startup control unit 310 sets a startup mode setting value to a value indicative of the firmware update mode 313. This value is stored in the configuration information in the non-volatile memory in the RAM 203.

In the restart processing in S414, after the program ends, the processing proceeds back to S401. The startup control unit 310 reads the boot program from the ROM 202 and starts the printer 130, as it does upon power-on. The startup control unit 310 starts the applications (S402), and in a case where the watchdog timeout does not occur while the application is being started (S403; No), the processing proceeds to S415.

In S415, the startup control unit 310 determines the startup mode.

In S415, the startup control unit 310 refers to the configuration information stored in the non-volatile memory and obtains the startup mode setting value. For example, in a case where the power is turned off during operation in the safe mode 312 and then the power is turned back on, the startup control unit 310 determines that the startup mode is the safe mode 312. In this case, the processing proceeds to S407, and the startup control unit 310 disables some functions and starts the printer 130 in the safe mode 312 (S403; No→S415; SAFE MODE→S407). Note that the functions disabled in the startup in the safe mode are the same functions as the functions disabled in S408.

In S415, in a case where the startup control unit 310 determines that the startup mode is the firmware update mode 313 (S415; FIRMWARE UPDATE MODE), the processing proceeds to Step S416, and the startup control unit 310 starts the printer 130 in the firmware update mode 313.

After the startup in the firmware update mode 313, in S416, the startup control unit 310 updates the firmware. In S416, the CPU 201 accesses the manufacturer server 110, the provider of the firmware, and downloads the firmware update program. The CPU 201 (the startup control unit 310) then updates the control program stored in the ROM 202 with the update program.

Figures 5A, 5B, 5C:
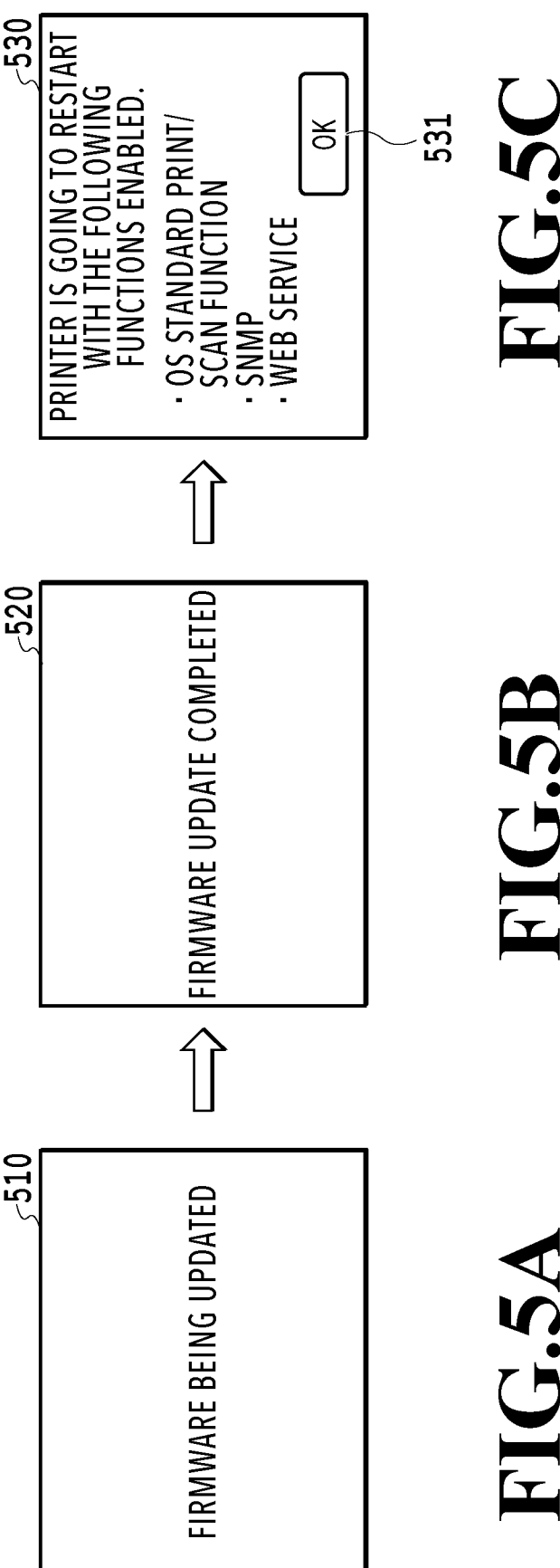
FIGS. 5A to 5C are diagrams showing how the screen changes during a firmware update.

During the firmware update, in S417, it is preferable that the CPU 201 (the display control unit 350) display a screen 510 shown in FIG. 5A on the display of the operation unit 217 to notify that a firmware update is being executed. It is also preferable that after the firmware update is completed and the control program is updated, the display control unit 350 display a screen 520 shown in FIG. 5B to notify that the firmware update is complete.

By thus sequentially presented with the progress of a firmware update during the firmware update, the user can know that a firmware update is being executed inside the printer 130.

After the completion of the firmware update, in S418, the CPU 201 (the startup control unit 310) determines whether there is watchdog timeout history information stored in the non-volatile memory in the RAM 203. In a case where the history information is stored (S418; Yes), the processing proceeds to S419. In a case where the history information is not stored (S418; No), the processing proceeds to S424.

In S419, the startup control unit 310 deletes the watchdog timeout history information.

After that, in S422, the startup control unit 310 enables the functions disabled in Step S408. After that, in S423, the startup control unit 310 sets the startup mode to the normal mode 311. In S423, the startup control unit 310 sets the startup mode setting value to a value indicative of the normal mode 311. This value is stored in the configuration information in the non-volatile memory in the RAM 203.

Note that, after S419, in S420, the CPU 201 (the display control unit 350) may display, for example, a screen 530 shown in FIG. 5C on the display of the operation unit 217. The screen 530 states that the printer 130 will restart with the disabled functions enabled.

The screen 530 shown in FIG. 5C shows a message stating "The printer is going to restart with the following functions enabled" or something to that effect and a list of the currently-disabled functions, such as the "OS standard print/scan function," the "SNMP," and the "web service." The screen 530 may also have an "OK" button 531, so that the printer 130 may stay in the current startup mode (the firmware update mode 313) unless the "OK" button 531 is operated (S421; No).

In a case where the user operates the "OK" button 531 in S421 (S421; Yes), the processing proceeds to S422 above. After S423 or in a case where the watchdog timeout history information is not stored in S418 (S418; No), the processing proceeds to S424.

In S424, the CPU 201 (the startup control unit 310) performs restart processing.

In the restart processing, first, in S424, the startup control unit 310 ends the program and then proceeds back to S401. The CPU 201 (the startup control unit 310) reads the boot program from the ROM 202 and starts the printer 130, as it does upon power-on. In a case where the watchdog timeout does not occur while the applications are started in S402 (S403; No), the startup control unit 310 determines the startup mode (S415).

In a case where it is determined in S415 that the startup mode is set to the normal mode 311 (S415; NORMAL MODE), the processing proceeds to S425.

In S425, the CPU 201 (the startup control unit 310) executes the startup processing in the normal mode 311. Although the flowchart in FIG. 4 shows that the firmware is updated after the power is turned off and then is turned back on, the present disclosure is not limited to this. Even in other than a case where the power-on, the monitor unit 330 may constantly monitor firmware update information, so that the firmware can be updated in a case where the firmware can be updated.

As described above, the printer 130 of the present embodiment is restarted with some functions disabled in a case where there is a firmware fault hindering the printer 130 from starting normally. Then, in a case where the watchdog timeout does not occur in that state, the printer 130 is restarted in the safe mode 312 as the startup mode. This allows the printer 130 to be started safely and operated while keeping as many functions that cause no faults as possible, so that convenience will not be greatly impaired.

Also, while being operated in the safe mode 312, the printer 130 continues to be operated in the safe mode 312 until a firmware update program becomes available. Then, once a firmware update program becomes available, the firmware is updated, disabled functions are then enabled, and the printer 130 is restarted back in the normal mode 311. This allows the printer 130 to be started back in the normal mode 311 with the firmware being corrected, without requiring the user to perform any operation.

Although the progress of a firmware update and the functions to be enabled in transition to the normal mode 311 are displayed on the operation unit 217 in the example described above, the present disclosure is not limited to this example.

For example, such display content may be displayed on the user terminal 140 communicatively connected to the printer 130. In that case, the user terminal 140 receives display data related to the update progress (display data on the screens 510, 520, and 530) from the printer 130 via the network I/F 205 and displays the display data on the display unit thereof. The user terminal 140 transmits operation information on the "OK" button 531 on the screen 510 to the printer 130 via the network I/F 205.

Second Embodiment

Next, a second embodiment of the present disclosure is described.

In the first embodiment, some functions that are disabled in the safe mode 312 are predetermined functions. However, not all the disabled functions can become a factor that contributes to a firmware fault. Thus, as the second embodiment, an example is described where a user can select functions to disable in transition to the safe mode 312. Note that the hardware configuration and functional configuration of the printer 130 of the second embodiment are not described because they are the same as those in the first embodiment, and the same units are denoted with the same reference numerals in the following description.

The operation performed after the power of the printer 130 of the second embodiment is turned on is the same as the processing shown in the flowchart in FIG. 4. As shown in the flowchart in FIG. 4, the CPU 201 (the startup control unit 310) starts the boot program (S401) and starts the firmware and the applications (S402).

In a case where a watchdog timeout occurs while the application is started (S403; Yes), the startup control unit 310 proceeds to exception handling (S404) and attempts to make a recovery by starting restart processing (ending the program) (S405). The startup control unit 310 stores the watchdog timeout history in the non-volatile memory in the RAM 203 (S406).

Figure 6:
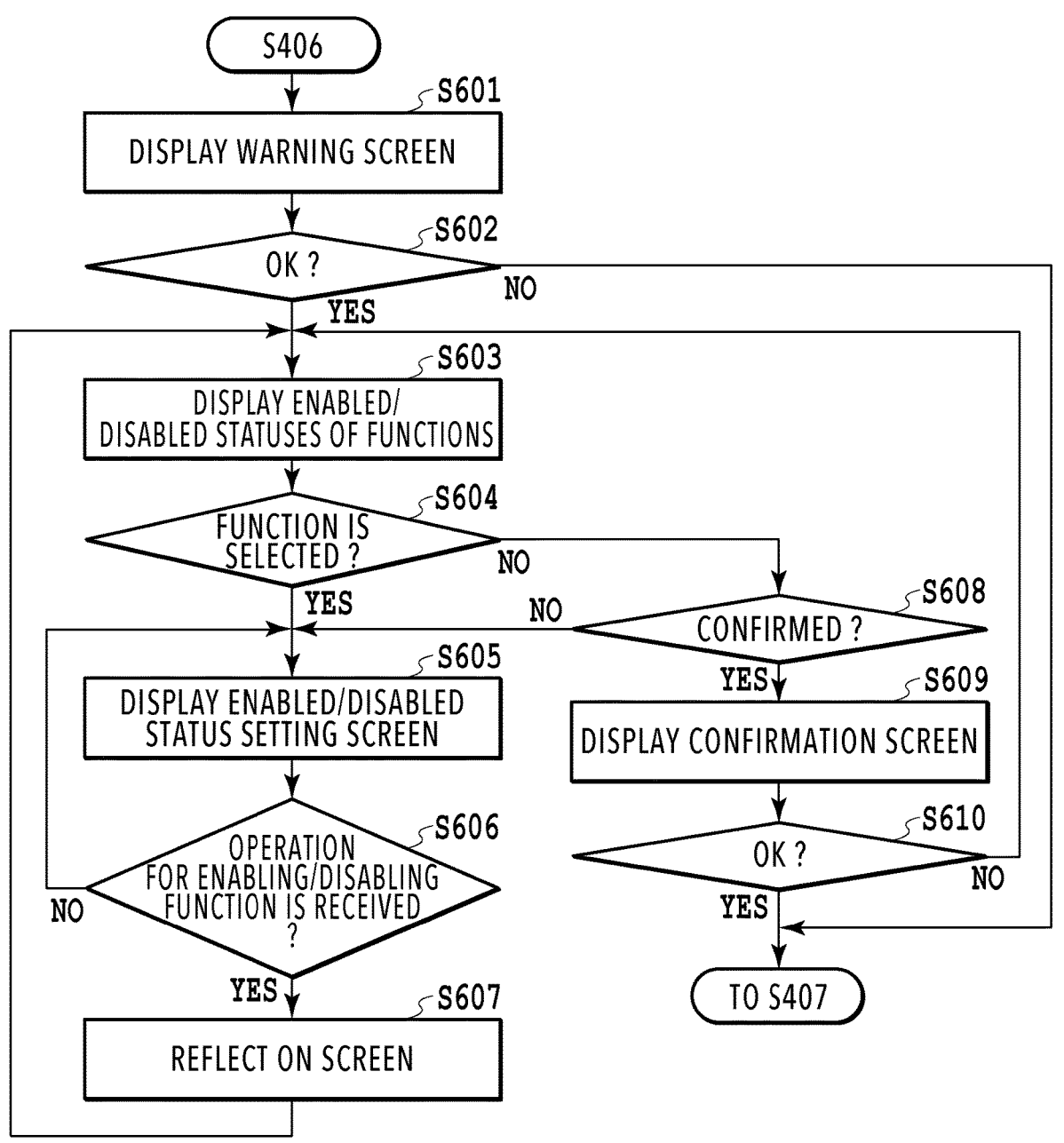
FIG. 6 is a flowchart showing how display processing is performed in transition to safe mode.

In the second embodiment, in S406, display processing shown in FIG. 6 is started. FIG. 6 is a flowchart showing how the display processing is performed in transition to the safe mode 312. Also, FIGS. 7A to 7D are diagrams showing how the screen changes in transition to the safe mode 312.

In S601, the CPU 201 (the display control unit 350) displays a warning screen 710 shown in FIG. 7A on the display of the operation unit 217. The warning screen 710 shows a message indicating that the printer 130 is going to restart and a message prompting the user to configure settings in a case where they have a function that they want to enable. The warning screen 710 also has an "OK" button 711.

In S602, in a case where a predetermined period of time which has been set in advance passes without the "OK" button 711 on the warning screen 710 being operated (S602; No), the processing proceeds to S407. In this case, the same processing as that performed in the first embodiment is performed.

In S602, in a case where the "OK" button 711 on the warning screen 710 is operated (S602; Yes), the processing proceeds to S603.

In S603, the display control unit 350 displays a status screen 720 showing the status (enabled or disabled) of each function. The status screen 720 shows candidate functions which can be selected to be enabled or disabled.

FIG. 7B is a diagram showing an example of the status screen 720. In the example in FIG. 7B, the "OS standard print/scan function," the "app C print/scan function," and the "SNMP" are shown as candidate functions that can be selected to be enabled or disabled, and each function has its status, "enabled" or "disabled," next thereto. The "app C print/scan function" is a printer application provided by the manufacturer of the printer 130. For example, in the default state, all the functions shown on the status screen 720 are set to "disabled."

Note that the functions shown on the status screen 720 are functions expected not to cause a firmware fault even in a case where the functions are enabled. Conversely, functions that need to be disabled (such as a web service that requires network communication connection) are not shown on the status screen 720 in FIG. 7B.

In S604, the CPU 201 receives selection of a function to be changed about its enabled/disabled status. A function is brought into the state of being selected once the user selects, through a touch or button operation, a display region showing the function, which is one of the functions displayed on the status screen 720. In a case where a function is selected, the processing proceeds to S605.

In S605, regarding the function selected, the CPU 201 displays an enabled/disabled status setting screen 730 like the one shown in FIG. 7C. The enabled/disabled status setting screen 730 in FIG. 7C has a detailed description about the "app C print/scan function" selected on the status screen 720, an "ENABLE" button 731, and a "DISABLE" button 732.

In S606, the CPU 201 receives an operation for selecting the enabled/disabled status. In a case where the user operates the "ENABLE" button 731, the CPU 201 sets the function selected in S604 to "enabled." In a case where the user operates the "DISABLE" button 732, the CPU 201 sets the function selected in S604 to "disabled." After the function is enabled or disabled by the user operation (S606; Yes), the processing proceeds to S607.

In S607, the CPU 201 reflects the enabled/disabled setting onto the status screen 720 in FIG. 7B, and the processing proceeds back to S603. In a case where another function is selected on the status screen 720 displayed in S603 (S604; Yes), the CPU 201 repeats the processing from S605 to S607.

In a case where a "CONFIRM" button 721 is operated on the status screen 720 without any function being selected (S604; No→S608; Yes), the processing proceeds to S609.

In S609, the CPU 201 displays a confirmation screen 740 shown in FIG. 7D. The confirmation screen 740 has a message indicating disabling functions and restarting, such as "The printer is going to restart with the following functions disabled," and a list of functions set to be disabled by the user on the screens 720 and 730. The confirmation screen 740 also has a message indicating a future action, such as "Once the firmware is published, the firmware will be updated, and the disabled functions will be enabled." Also, the confirmation screen 740 has a "RETURN" button 743 and an "OK" button 742.

In a case where the "RETURN" button 743 on the confirmation screen 740 is operated in S610 (S610; No), the processing proceeds back to S603, and the screen changes back to the status screen 720 in FIG. 7B. In a case where the "OK" button 742 on the confirmation screen 740 is operated (S610; Yes), the CPU 201 stores information indicating whether the functions are enabled or disabled, which is set on the screens 720 and 730, in the configuration information in the non-volatile memory in the RAM 203, and the flowchart in FIG. 6 ends. After that, the processing proceeds to S407 in FIG. 4.

In S407, the CPU 201 (the startup control unit 310) starts the boot program. After that, based on the information indicating the statuses (enabled or disabled) of the functions saved in the configuration information in the non-volatile memory in the RAM 203, the functions set to be disabled are disabled (S408), and the enabled functions (applications) are started (S409).

In a case where an enabled function is a cause of a fault, a watchdog timeout occurs (S410; Yes), and the processing proceeds back to S404. In a case where an enabled function is not a cause of a fault, a watchdog timeout does not occur (S410; No), and the processing proceeds to S411 to set the startup mode to the safe mode 312 and start the printer 130 in the safe mode 312 (S412).

As described, in the second embodiment, as shown in FIGS. 7A to 7D, the user is provided with a user interface for selecting a function to disable in the safe mode 312. Thus, the printer 130 can be started with a function which does not cause a fault being enabled by a user operation even in a case where the function is predetermined to be disabled. Thus, even in the safe mode 312, as many functions of the printer 130 in the normal mode 311 as possible can be kept, so that the printer 130 that does not lower user convenience can be provided.

Although the printer 130 is used as an example of an incorporated device in the embodiments described above, the present disclosure is not limited to this. The present disclosure can be applied to various devices having a function specialized for a particular purpose (i.e., incorporated devices), such as, for example, an image capturing device, a video device, an audio device, and a lighting device. Also, the configurations, processing procedures, display screens, and the like described in the embodiments can be modified as needed without departing from the gist of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-064035, filed Apr. 11, 2023, which is hereby incorporated by reference wherein in its entirety.

What is claimed is:

1. An incorporated device comprising:

one or more processors; and one or more memories storing instructions that, when executed by the one or more processors, cause the incorporated device to:

execute a startup process in a first mode in which a first function and a second function are enabled, wherein the first function is a function to connect with external devices via a network, and the second function is a function to determine whether firmware update information is stored in other external devices via the network;

execute, in a case where a firmware fault occurs in the startup process, the startup process in a second mode in which the first function is disabled and the second function is enabled;

execute the second function in the second mode;

execute a process of updating the firmware in a case where the firmware update information is stored in the other external devices; and execute the startup process in the first mode based on the updated firmware.

2. The incorporated device according to claim 1, wherein the one or more processors cause the incorporated device to record a history of the fault, and delete the history after the firmware is updated.

3. The incorporated device according to claim 1, wherein the one or more processors cause the incorporated device to display, while the firmware is updated, a progress of the update.

4. The incorporated device according to claim 1, wherein the first function disabled in the second mode is predetermined.

5. The incorporated device according to claim 1, wherein the one or more processors cause the incorporated device to receive a selection of a function to disable in the second mode, and continue the startup in the second mode in a case where the fault does not occur after the incorporated device is restarted with the selected function being disabled.

6. The incorporated device according to claim 5, wherein the one or more processors cause the incorporated device to display a candidate function whose status is selectable to be enabled or disabled.

7. A method for controlling startup of an incorporated device, the method comprising:

executing a startup process in a first mode in which a first function and a second function are enabled, wherein the first function is a function to connect with external devices via a network, and the second function is a function to determine whether firmware update information is stored in other external devices via the network;

executing, in a case where a firmware fault occurs in the startup process, the startup process in a second mode in which the first function is disabled and the second function is enabled;

executing the second function in the second mode;

executing a process of updating the firmware in a case where the firmware update information is stored in the other external devices; and executing the startup process in the first mode based on the updated firmware.

8. A non-transitory computer readable storage medium storing a program for executing a method for controlling startup of an incorporated device, the method comprising:

executing a startup process in a first mode in which a first function and a second function are enabled, wherein the first function is a function to connect with external devices via a network, and the second function is a function to determine whether firmware update information is stored in other external devices via the network;

executing, in a case where a firmware fault occurs in the startup process, the startup process in a second mode in which the first function is disabled and the second function is enabled;

executing the second function in the second mode;

executing a process of updating the firmware in a case where the firmware update information is stored in the other external devices; and executing the startup process in the first mode based on the updated firmware.

9. The incorporated device according to claim 1, wherein the incorporated device is a printing apparatus.

10. The incorporated device according to claim 9, wherein the first function is a function to execute printing based on printing data received via the network.

11. The incorporated device according to claim 1, wherein the one or more processors update the firmware automatically in a case where the firmware update information is stored in the other external devices.

* * * * *